(12) United States Patent
Falb

(10) Patent No.: US 11,912,202 B2
(45) Date of Patent: Feb. 27, 2024

(54) DUAL-FUNCTION IMAGING SYSTEM

(71) Applicant: GENTEX CORPORATION, Zeeland, MI (US)

(72) Inventor: David M. Falb, Grand Rapids, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 17/884,713

(22) Filed: Aug. 10, 2022

(65) Prior Publication Data
US 2023/0047960 A1 Feb. 16, 2023

Related U.S. Application Data

(60) Provisional application No. 63/260,288, filed on Aug. 16, 2021.

(51) Int. Cl.
*B60R 1/26* (2022.01)
*H04N 5/262* (2006.01)
*H04N 23/69* (2023.01)

(52) U.S. Cl.
CPC ............ *B60R 1/26* (2022.01); *H04N 5/2628* (2013.01); *H04N 23/69* (2023.01); *B60R 2300/10* (2013.01); *B60R 2300/30* (2013.01); *B60R 2300/802* (2013.01)

(58) Field of Classification Search
None
See application file for complete search history.

(56) References Cited

U.S. PATENT DOCUMENTS

| | | | |
|---|---|---|---|
| 2016/0011419 A1 | 1/2016 | Gao | |
| 2018/0332243 A1* | 11/2018 | Aihara | ...................... B60R 1/00 |
| 2019/0191064 A1 | 6/2019 | Aihara et al. | |
| 2019/0273889 A1* | 9/2019 | Aihara | ................... G02B 13/00 |
| 2021/0035271 A1 | 2/2021 | Naidu et al. | |
| 2022/0408030 A1* | 12/2022 | Ollila | ....................... G02B 3/14 |

FOREIGN PATENT DOCUMENTS

| JP | 6459016 B2 | 1/2019 |
|---|---|---|
| JP | 2021086694 A | 6/2021 |

OTHER PUBLICATIONS

International Search Report dated Nov. 24, 2022, for corresponding PCT application No. PCT/US2022/039898, 4 pages.
Written Opinion dated Nov. 24, 2022, for corresponding PCT application No. PCT/US2022/039898, 6 pages.

* cited by examiner

*Primary Examiner* — Rebecca A Volentine
(74) *Attorney, Agent, or Firm* — Price Heneveld LLP; Brian James Brewer

(57) ABSTRACT

A dual-function imaging system may comprise an imager comprising a lens, the lens having an inner region and an outer region surrounding the inner region; an image processor in communication with the imager; a first video display element in communication with the image processor; and a second video display element in communication with the image processor. The lens may have a first effective magnification level in the inner region and a second effective magnification level in the outer region.

20 Claims, 2 Drawing Sheets

DUAL-FUNCTION IMAGING SYSTEM

CROSS REFERENCE TO RELATED APPLICATIONS

This application claims the benefit of and priority to U.S. Provisional Patent Application No. 63/260,288, filed on Aug. 16, 2021, entitled "Dual-Use Imaging System," the entire disclosure of which is hereby incorporated herein by reference.

FIELD OF THE DISCLOSURE

This disclosure relates generally to imagers used in vehicles, and in particular, to using a single imager in a vehicle used for dual purposes.

BACKGROUND

Many vehicles have a first camera or imager that may be used for backing up. The first imager may be a back-up imager and may be disposed to capture images to the rear of the vehicle when the vehicle transmission is in reverse gear. The back-up imager generally requires approximately 130-180 degrees field of view, but may have a low angular resolution, such as 10 pixels per degree.

Many vehicles also have a second camera or imager that captures images to the rear of the vehicle when the vehicle is not in reverse gear. These captured images may be displayed on a rearview assembly. This second camera or imager may be approximately 30 to 32 pixels per degree but have a field of view of about fifty degrees.

To combine both imagers into a single system and to have the needed resolution for the rearview assembly, the imager would need to be 30-32 pixels per degree but would require a field of view of about 130-180 degrees. This would result in a pixel width of approximately 4200-5000. Imagers capable of this resolution are generally 10-12 megapixels (MP) in resolution and are not rated for use in automotive applications. Furthermore, the processor required to process the captured images would be large and costly.

SUMMARY

According to an aspect, a dual-function imaging system may comprise an imager comprising a freeform optic lens. The freeform optic lens may comprise an inner region and an outer region surrounding the inner region. The dual-function imaging system may further comprise an image processor in communication with the imager; a first video display element in communication with the image processor; and a second video display element in communication with the image processor. The inner region of freeform optic lens may have a first effective magnification level and the outer region may have a second effective magnification level different from the first effective magnification level. The inner region of the freeform optic lens may be asymmetric within the freeform optic lens.

The first effective magnification level may be higher than the second effective magnification level. The inner region of the freeform optic lens may be configured to capture images to be displayed in a full-display rearview assembly. The inner region may have an angular resolution of approximately 32 pixels per degree. The field of view of the inner region of the freeform optic lens may be approximately 50 degrees. The field of view of the inner region may be approximately 1600 pixels wide.

The outer region of the freeform optic lens may be configured to capture images to be used for a back-up display when the vehicle transmission may be in a reverse state. The outer region may comprise an area of the freeform optic lens from about 25 degrees to about 65 degrees. The field of view of the outer region of the freeform optic lens may be between 130 and 150 degrees. The outer region may have an angular resolution of between approximately 10 and 12 pixels per degree. The field of view of the outer region may be between 2000 and 3000 pixels wide. The image processor may be approximately 8 megapixels or less. The imaging system may be disposed in a vehicle.

According to another aspect, a method of displaying images in a dual-function imaging system, may comprise providing an imaging system with a freeform optic lens having a inner region with a first magnification level and an outer region with a second magnification level lower than the first magnification level; capturing images of a first scene with the imager using the inner region of the freeform optic lens; capturing images of a second scene with the imager using the outer region of the freeform optic lens; processing, with an image processor, image data from the captured images; causing images from the first scene to be displayed on a first video display element; and causing images from the first scene and the second scene to be combined and displayed on a second video display element.

The dual-function imaging system may be disposed in a vehicle. The inner region of the freeform optic lens may be configured to capture images to be displayed in a full-display rearview assembly. The inner region has an angular resolution of approximately 32 pixels per degree and a field of view of approximately 50 degrees. The outer region of the freeform optic lens may be configured to capture images to be displayed in a center console. The outer region of the freeform optic lens may be configured to capture images to be displayed in at least a portion of a rearview assembly. The outer region has an angular resolution of approximately 10-12 pixels per degree and a field of view in the range of 135 to 180 degrees.

DETAILED DESCRIPTION

Figure 1:
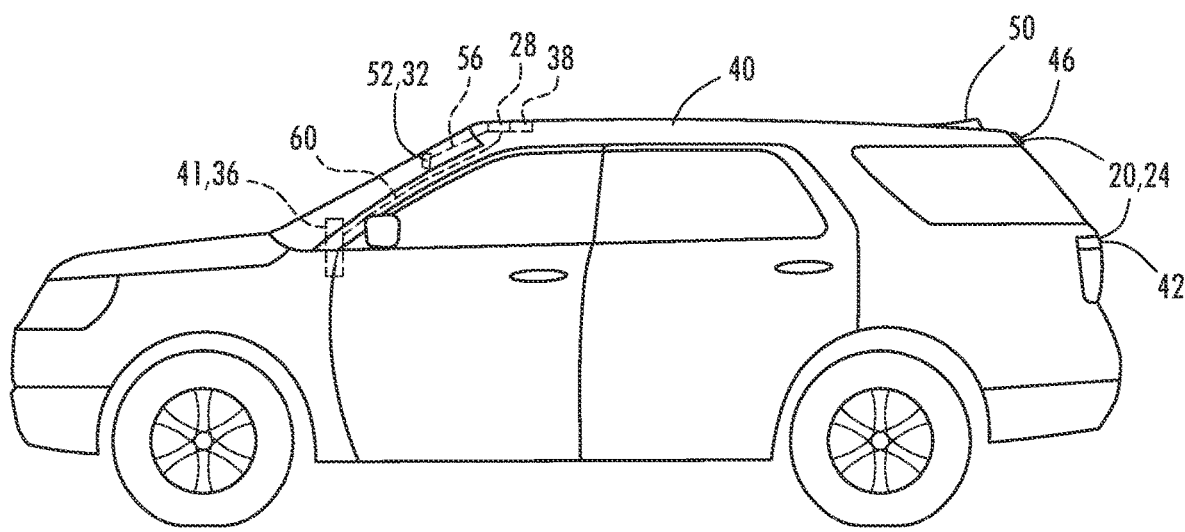
FIG. 1 illustrates a vehicle having a dual-function imaging system as described herein.
Figure 2:
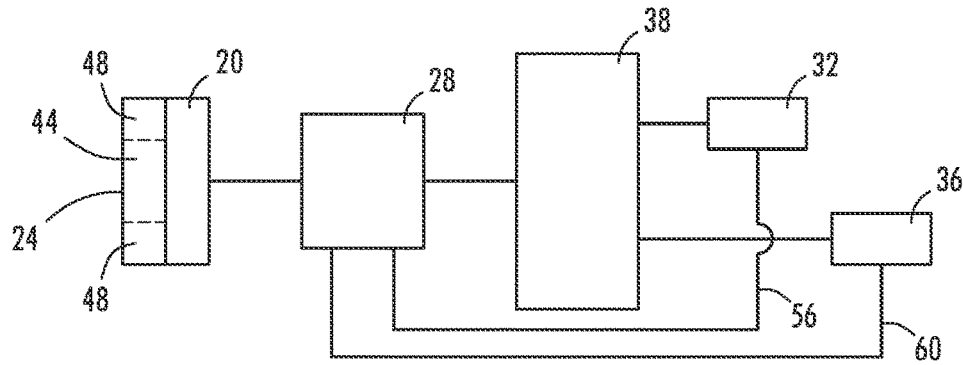
FIG. 2 illustrates a block diagram of the dual-function imaging system of FIG. 1.

Referring to FIGS. 1 and 2, a dual-function imager system, generally indicated at reference number 10, may comprise a camera or imager 20 having a lens 24, an image processor 28, and at least a first video display element 32. Dual-function imager system 10 may also include a second video display element 36. Dual-function imager system 10 may use the single lens 24 and imager 20 to provide inputs to each of first video display element 32 and second video display element 36. Dual-function imaging system 10 may further comprise a controller 38. Dual-function imaging system 10 may be configured to achieve two different levels of magnification or zoom with one fixed lens and the lens may be approved for use in vehicle applications. Dual-function imager system 10 may be disposed on or in a vehicle 40.

Camera or imager 20 may be disposed on vehicle 40, and in particular may be disposed on a rear portion of a vehicle 40, such as on a tailgate 42, on or in proximity to a rear window or rear window frame 46, in or on a trunk latch, or within or on a shark fin antenna assembly 50. Imager 20 may have a field of view to the rear of vehicle 40. Imager 20 may be configured to capture scenes in the field of view and may generate image data from the captured images. Imager 20 may include an image sensor 22 such as a complementary metal-oxide-semiconductor ("CMOS") or charge-coupled display ("CCD") that can create image data when activated.

Figure 3:
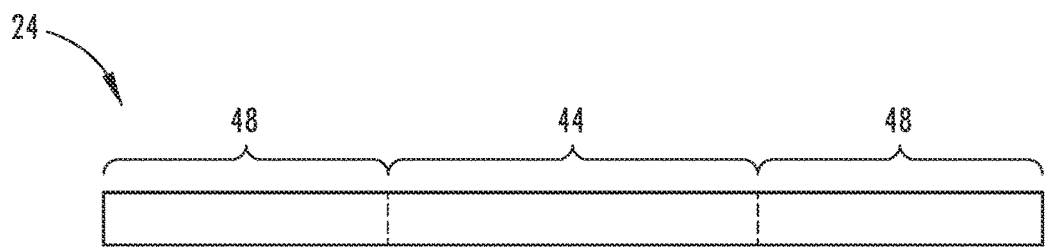
FIG. 3 illustrates a side view showing the locations of regions of a lens used with the system of claim 1.

Referring now to FIG. 3, lens 24 may comprise a freeform optic having an inner region 44 and an outer region 48 generally surrounding inner region 44. Inner region 44 of freeform optic 24 may have a higher effective magnification level than the effective magnification level in outer region 48. Inner region 44 may comprise the center 50-60 degrees of lens 24. Outer region 48 may comprise an area extending from approximately an outer perimeter of inner region 44 to an area comprising about 60-70 degrees of lens 24.

For example, inner region 44 may comprise the central approximately 50 degrees of lens 24 and outer region 48 may comprise an area extending from approximately 25 degrees to approximately 65 degrees. Continuing the example, inner region 44 may capture images to be used to display on a rearview assembly having a display element such as a full display rearview assembly 52. The images may be of a scene behind the vehicle such as, for example, a scene that would typically be captured by a rearview mirror of a vehicle. Full display rearview assembly 52 may require a relatively high spatial resolution and relatively small field of view. Accordingly, the inner region 44 of lens 24 may have an angular resolution of about 25-40 pixels per degree or about 32 pixels per degree and a field of view that is about 35-65 degrees or about 50 degrees. Field of view may be about 1400-1800 pixels wide or about 1600 pixels wide.

Continuing the example, outer region 48 of lens 24 may extend from approximately 25 degrees to approximately 65 degrees. Outer region 48 of lens 24 may be configured to capture images to be used, for example, for a back-up display when the vehicle transmission is in a reverse state. Back-up imagers on vehicles generally require less spatial resolution but larger fields of view than those required for full display rearview assemblies. In some embodiments, back-up imagers may require fields of view of between about 130 and 180 degrees, or about 150 degrees. Accordingly, outer region 48 may have a spatial resolution of 8 to 15 pixels per degree or 10-12 pixels per degree, resulting in a camera with a pixel width of between 2000 and 3000 pixels or about 2400-2600 pixels. For example, the backup camera may need a horizontal resolution of 1300 for the case of 130 degrees at 10 pixels per degree. The camera that captures images to be displayed on at least one of first video display element 32 and second video display element 36 may need a horizontal resolution of (130-50 deg)*10 pixel per degree+50 deg*30 pixel per degree=2300 pixels By using a lens 24 that has a higher effective magnification level in the inner region 44 for use with full display rearview assembly 52 and a lower effective magnification level in the outer region 48 that is used for the back-up feature, the imager size and the associated image processor requirements could be reduced to a size of about 5 megapixels. Imagers are available for automotive applications in approximately an 8.0 to 8.3 megapixel size, and the required resolution could be supported by an automotive 8 or 8.3 megapixel imager. With a camera of this size, resolution could reach 3840×2160.

The image data may be transmitted to image processor 28. Image processor 28 may be a microprocessor configured discreetly or instantiated using various components such as a field programmable gate array (FPGA) or digital signal processor (DSP), a combination of discrete and FPGA and DSP, or the like. Processor may be configurable and/or adapted to perform a plurality of functions. These functions may include but are not limited to a vehicle headlamp control, lane departure warning and other driver assist features. Image processor 28 may be configured to de-warp the image in the transitional area between the two magnification levels.

In some embodiments, processor may be co-located with imager 20, either on the same or on separate circuit boards. Processor may alternatively be located in a rear-view mirror body and may serve to perform additional functions such as a compass sensor and/or control of an auto-dimming or transflective rear-view mirror. Similarly, processor can also be located in a headliner, over-head console, or other suitable location in vehicle 40.

Processor 28 may be configured to transmit the processed image data for display to first video display element 32 and/or to second video display element 36. In some embodiments, first video display element 32 may comprise the display element of a full display rearview assembly 52. Processed image data captured by the inner region 44 of lens 24 may be displayed on first video display element 32. Images displayed on first video display element 32 may be images of a scene to the rear of vehicle 40. Images may be transmitted to first video display element 32 via a first connection 56 such as a first parallel connection, a MIPI DSI connection, an OpenDL connection, a Serializer/Deserializer (SerDes) or an ethernet connection.

In a full display rearview assembly application, the camera may be configured to see from about 10 degrees above the horizon to about 10 degrees below the horizon. Accordingly, inner region 44 of lens 24 may be asymmetric within lens rather than evenly spaced from top and bottom edges of lens 24. This may allow inner region 44 to capture images from about ten degrees above the horizon to about ten degrees below the horizon. To achieve this, a high-resolution area on imager 20 would need to be offset to the upper portion of imager 20. Achieving this would require the use of an optic which could allow for a lens 24 having variable magnification level with an asymmetric design combined with the capability to de-warp the image in a transitional area between the two magnification levels.

In some embodiments, a center axis of lens 24 may be offset from a center axis of imager 20. This would allow for higher resolution in some regions while preserving a symmetric lens.

Second video display element 36 may comprise the display element of a back-up display system. This may be, for example, a display screen on an infotainment center of a center console 41 of vehicle 40. Processed images captured by the outer region 48 of lens 24 may be displayed on second video display element 36. Images displayed on second video display element 36 may be images of a scene directly behind vehicle 40. Images may be transmitted to second video display element 36 via a second connection 60 such as a second parallel connection, a MIPI DSI connection, an OpenDL connection, a Serializer/Deserializer (SerDes) or an ethernet connection. In the back-up application, imager 20 may be aimed downward at about a 45 degree angle. This may allow imager 20 to have a field of view generally from the vehicle bumper to above the horizon.

Controller 38 may be configured to receive inputs from processor 28. Controller 38 may further be configured to cause images captured by inner region 44 of lens 24 to be displayed on first video display element 32. Controller may further be configured to cause images captured by outer region 48 of lens 24 to be displayed on second video display element 36. Controller 38 may include a microprocessor, microcontroller, application-specific integrated circuit (ASIC), graphics processing unit (GPU), Digital Signal Processor (DSP), or other circuitry configured to perform the various input/output, control, and other functions described herein.

Figure 4:
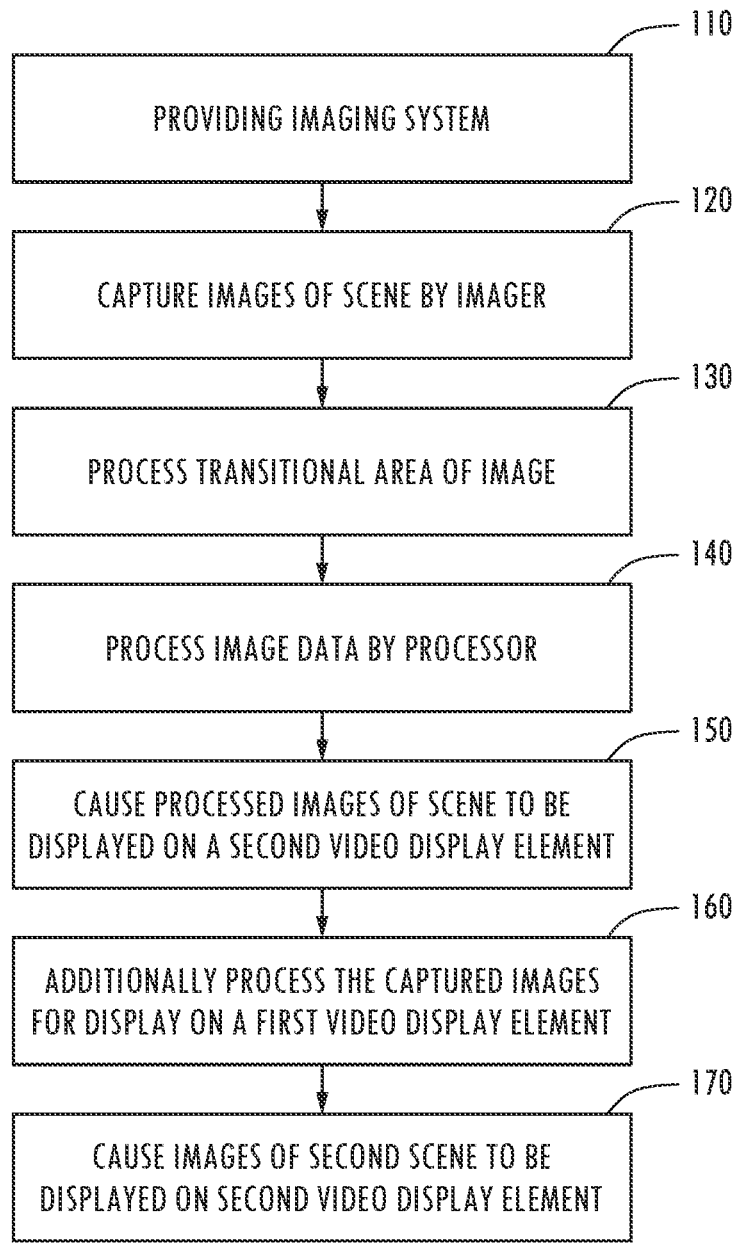
FIG. 4 illustrates a flow chart of a method of using a dual-function imaging system as described herein.

As shown in FIG. 4, a method 100 of displaying images in a dual-function imaging system 10 may comprise, at step 110, providing a dual-function imaging system 10 with a lens 24 having an inner region 44 having a first magnification level and an outer region 48 having a second magnification level. The second magnification level may be lower than the first magnification level. The method may further comprise, at step 120, capturing, using both inner region 44 and outer region 48 of lens 24 of imager 20, images of a scene to the rear of vehicle 40. The captured image may include a transitional area between the two magnification levels. Image processor 28 may be in communication with imager 20 and, at step 130, image processor 28 may process the transitional area, adjusting so there is not a sharp divide between the two different magnification levels in the resulting images. In step 140, image processor 28 may process the captured images. Controller 38 may be configured to, in step 150, cause processed images from the scene to be displayed on second video display element 36. In step 160, image processor 28 may be further configured to additionally process the captured images for display on first video display element 32. The additional processing may include cropping the images. The images may be cropped to include the higher magnification level area that comes from the inner region 44 of lens 24. The first video display element 32 may run at a higher frame rate than the second video display element 36 so there may be a second image of only the region shown in the first video display element 32. In step 170, controller 38 may be further be configured to cause the additionally-processed images from the second scene to be displayed on second video display element 36.

The above description is considered that of the preferred embodiments only. Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

In this document, relational terms, such as first and second, top and bottom, front and back, left and right, vertical, horizontal, and the like, are used solely to distinguish one entity or action from another entity or action, without necessarily requiring or implying any actual such relationship, order, or number of such entities or actions. These terms are not meant to limit the element which they describe, as the various elements may be oriented differently in various applications. Furthermore, it is to be understood that the device may assume various orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

It will be understood that any described processes or steps within described processes may be combined with other disclosed processes or steps to form structures within the scope of the present disclosure. The exemplary processes disclosed herein are for illustrative purposes and are not to be construed as limiting. It is also to be understood that variations and modifications can be made on the aforementioned methods without departing from the concepts of the present disclosure, and further it is to be understood that such concepts are intended to be covered by the following claims unless these claims by their language expressly state otherwise.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the terms "about" and "approximately" mean that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within at least one of 2% of each other, 5% of each other, and 10% of each other.

The invention claimed is:

1. A dual-function imaging system for a vehicle, comprising:
    an imager configured to capture image data comprising a freeform optic lens, wherein the freeform optic lens comprises an inner region and an outer region surrounding the inner region;
    an image processor in communication with the imager, the image processor receiving the image data from the imager to form a first image portion and a second image portion;
    a first video display element in communication with the image processor and configured to display the first image portion at a first frame rate; and
    a second video display element in communication with the image processor and configured to display the second image portion at a second frame rate lower than the first frame rate;
    wherein the inner region of the freeform optic lens has a first effective magnification level and the outer region has a second effective magnification level different from the first effective magnification level;
    wherein the image processor is configured to correct a portion of the second image portion demonstrating a transition from the first effective magnification level to the second effective magnification level and output the combined first and second image portions at the second frame rate; and
    wherein the inner region of the freeform optic lens is asymmetric within the freeform optic lens.

2. The imaging system of claim 1, wherein the first effective magnification level is higher than the second effective magnification level.

3. The imaging system of claim 2, wherein the image processor is capable of de-warping the image data in a transitional area between the first effective magnification level and the second effective magnification level.

4. The imaging system of claim 1, wherein the inner region of the freeform optic lens is configured to capture images to be displayed in a full-display rearview assembly.

5. The imaging system of claim 1, wherein the inner region has an angular resolution of approximately 32 pixels per degree.

6. The imaging system of claim 1, wherein a field of view of the inner region of the freeform optic lens is approximately 50 degrees.

7. The imaging system of claim 1, wherein a field of view of the inner region is between approximately 1480 and 1600 pixels wide.

8. The imaging system of claim 1, wherein both the outer region of the freeform optic lens and the inner region of the freeform optic lens are used to capture images to be used for a back-up display when the vehicle is in a reverse state.

9. The imaging system of claim 1, wherein the outer region comprises an area of the freeform optic lens from about 25 degrees to about 65 degrees.

10. The imaging system of claim 1, wherein a field of view of the outer region of the freeform optic lens is between 130 and 150 degrees; and wherein the outer region has an angular resolution of between approximately 10 and 12 pixels per degree.

11. The imaging system of claim 1, wherein a field of view of the outer region is between 2000 and 3000 pixels wide.

12. The imaging system of claim 1, wherein the imager comprises a resolution of approximately 8 megapixels or less.

13. The imaging system of claim 1, wherein the inner region is generally centered in a horizontal direction within the freeform optic lens and is offset toward the top of the freeform optic lens when the freeform optic lens is in place and properly positioned in a vehicle.

14. The imaging system of claim 1, wherein the first image portion is a portion of the second image portion.

15. A method of displaying images in a dual-function imaging system, comprising:
    providing an imaging system with a freeform optic lens having an inner region with a first magnification level and an outer region with a second magnification level lower than the first magnification level;
    capturing images of a first scene with an imager using the inner region of the freeform optic lens;
    capturing images of a second scene with the imager using the outer region of the freeform optic lens;
    processing image data in a transitional area between the first magnification level of the inner region and the second magnification level of the outer region, with an image processor, to correct the image data from the first scene and the second scene;
    causing images from the first scene to be displayed on a first video display element having a first frame rate; and
    causing images from the first scene and the second scene to be combined and displayed on a second video display element having a second frame rate that is lower than the first frame rate, wherein the second frame rate is associated with the image data in the transitional area that has been modified to correct the transitional area between the first scene and the second scene.

16. The method of claim 15, wherein the dual-function imaging system is disposed in a vehicle.

17. The method of claim 15, wherein the inner region of the freeform optic lens is configured to capture images to be displayed in a full-display rearview assembly.

18. The method of claim 15, wherein the inner region has an angular resolution of approximately 32 pixels per degree and a field of view of approximately 50 degrees.

19. The method of claim 15, wherein the outer region of the freeform optic lens is configured to capture images, and wherein the captured images are displayed in one of a center console and at least a portion of a rearview assembly.

20. The method of claim 15, wherein the outer region has an angular resolution of approximately 10-12 pixels per degree and a field of view in the range of 135 to 180 degrees.

* * * * *